United States Patent
Chang

(10) Patent No.: US 9,545,723 B2
(45) Date of Patent: Jan. 17, 2017

(54) ROBOTIC ARM AND DISPLAY DEVICE USING THE SAME

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 13 days.

(21) Appl. No.: 14/788,049

(22) Filed: Jun. 30, 2015

(65) Prior Publication Data
US 2016/0250754 A1 Sep. 1, 2016

(30) Foreign Application Priority Data
Feb. 26, 2015 (CN) .......................... 2015 1 0088327

(51) Int. Cl.
G05B 15/00 (2006.01)
G05B 19/00 (2006.01)
B25J 9/16 (2006.01)
F16M 11/20 (2006.01)

(52) U.S. Cl.
CPC ............. *B25J 9/1697* (2013.01); *B25J 9/1664* (2013.01); *B25J 9/1669* (2013.01); *F16M 11/2064* (2013.01); *Y10S 901/09* (2013.01); *Y10S 901/15* (2013.01); *Y10S 901/47* (2013.01)

(58) Field of Classification Search
None
See application file for complete search history.

*Primary Examiner* — Bhavesh V Amin
(74) *Attorney, Agent, or Firm* — Zhigang Ma

(57) ABSTRACT

A robotic arm connected to a display device includes a plurality of connecting members rotatably connected to each other via a plurality of shafts. Each shaft can be rotated by a motor. The robotic arm further includes a camera configured to capture images of a user, and a processor configured to execute a plurality of modules. The modules include an obtaining module configured to obtain the captured images; an image analyzing module configured to determine whether a user is moving a body part according to a plurality of successively obtained images and determine a direction and amplitude of the movement; and a signal generating module configured to generate a first control module according to the determined direction and amplitude of the movement, and transmit the generated first control signal to inform at least one motor to rotate the shaft secured thereto.

16 Claims, 5 Drawing Sheets

ROBOTIC ARM AND DISPLAY DEVICE USING THE SAME

FIELD

The subject matter herein generally relates to a robotic arm and a display device using the robotic arm.

BACKGROUND

Many portable electronic devices, such as cell phones, digital photo frames and tablet computers, include stands for supporting the electronic devices on a desk or other flat surfaces. A user can adjust an orientation of an electronic device via the stand.

BRIEF DESCRIPTION OF THE DRAWINGS

Implementations of the present technology will now be described, by way of example only, with reference to the attached figures.

DETAILED DESCRIPTION

Figure 1:
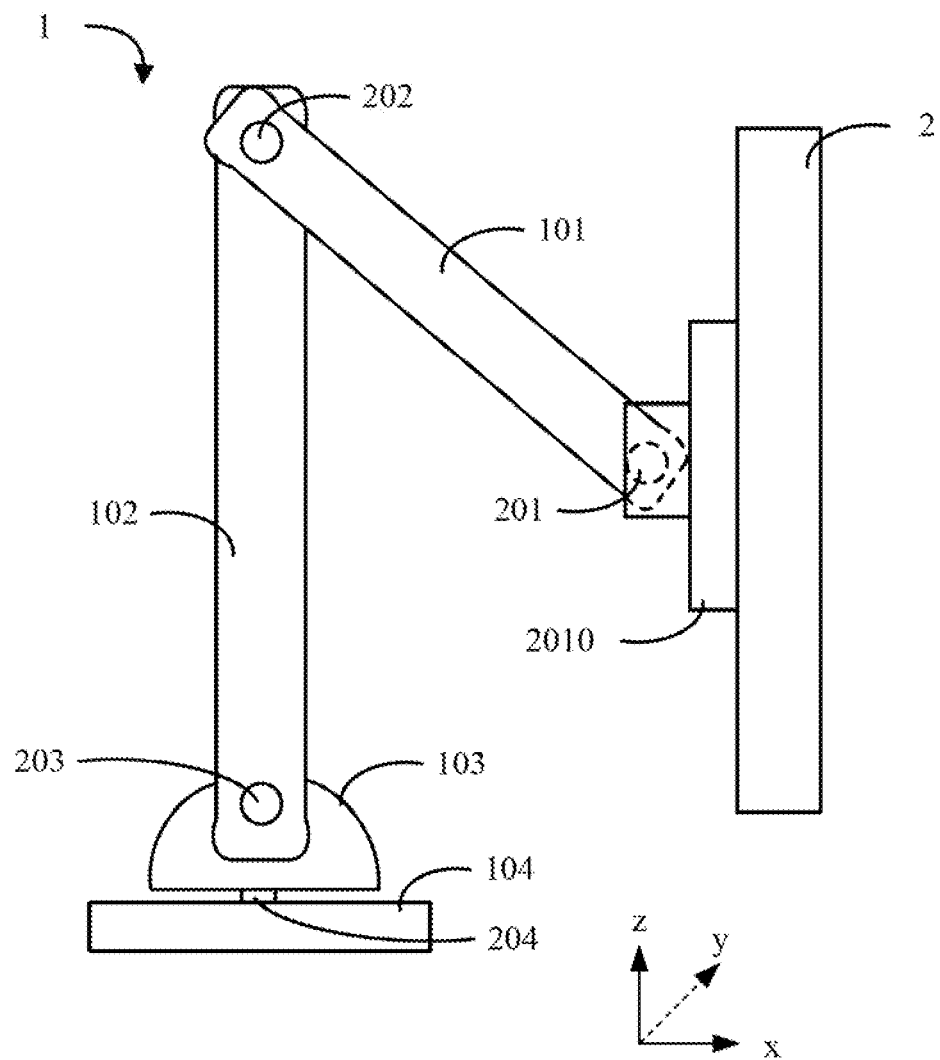
FIG. 1 is a diagrammatic view of an embodiment of a robotic arm in a first state.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates an embodiment of a robotic arm 1 connected to a display device 2 for adjusting an orientation of the display device 2 and/or a distance between a user and the display device 2. The display device 2 can be a table computer, a cell phone, a digital photo frame, an electronic book, or a flat television.

Figure 2:
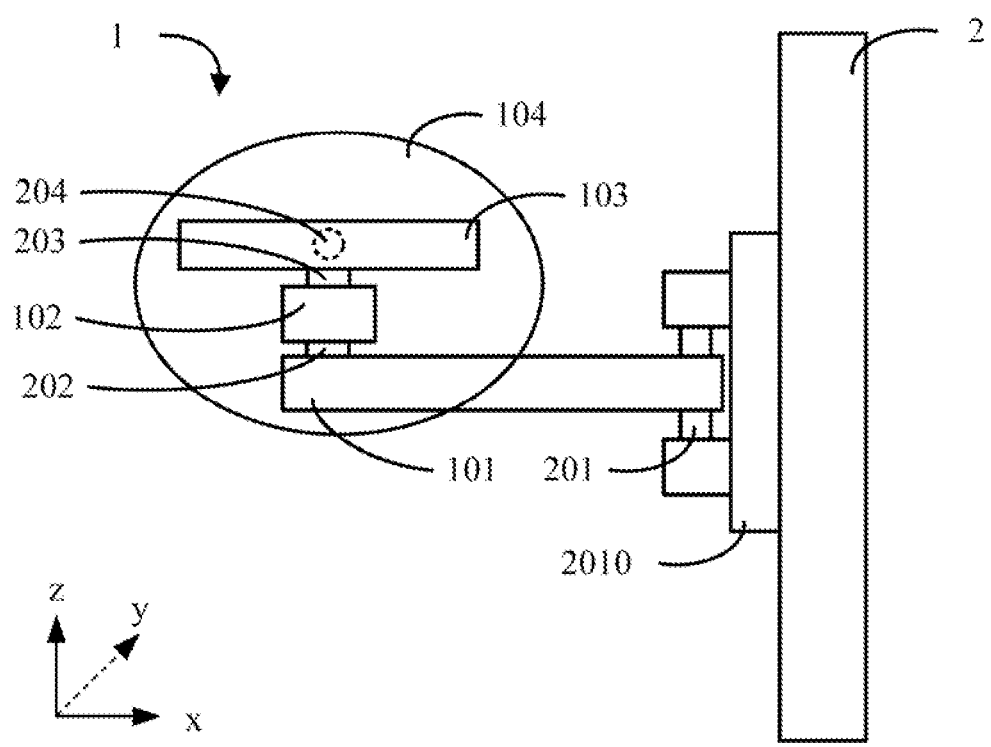
FIG. 2 is similar to FIG. 1, but showing the robotic arm from a different angle.

Also referring to FIG. 2, in at least one embodiment, the robotic arm 1 includes a first connecting member 101, a second connecting member 102, a third connecting member 103, and a fourth connecting member 104. The first connecting member 101 and the second connecting member 102 can be rod-shaped. The third connecting member 103 and the fourth connecting member 104 can be disk-shaped. An end of the first connecting member 101 is rotatably connected to the display device 2 via a first shaft 201. An opposite end of the first connecting member 101 away from the first shaft 201 is rotatably connected to an end of the second connecting member 102 via a second shaft 202. An opposite end of the second connecting member 102 away from the second shaft 202 is rotatably connected to the third connecting member 103 via a third shaft 203. A bottom of the third connecting member 103 is rotatably connected to the fourth connecting member 104 via a fourth shaft 204. A bottom of the fourth connecting member 104 can be secured to a supporting surface (for example, a desk, a wall, or other flat surface) by such methods as adhesive or screws.

In at least one embodiment, a securing mechanism 2010 is secured to the first shaft 201. A back portion of the display device 2 is secured to the first shaft 201 via the securing mechanism 2010, thereby securing to the robotic arm 1.

The first shaft 201, the second shaft 202, the third shaft 203, and the fourth shaft 204 can rotate about in a preset angle range relative to the first connecting member 101, the second connecting member 102, the third connecting member 103, and the fourth connecting member 104, respectively. When the first shaft 201 rotates, the display device 2 secured thereto is rotated with the first shaft 201. When the second shaft 202 rotates, the first connecting member 101 secured thereto is rotated with the second shaft 202. When the third shaft 203 rotates, the second connecting member 102 secured thereto is rotated with the third shaft 203. When the fourth shaft 204 rotates, the third connecting member 103 secured thereto is rotated with the fourth shaft 204. A motor 40 (shown in FIG. 5, assembled inside the robotic arm 1) is secured to each of the first shaft 201, the second shaft 202, the third shaft 203, and the fourth shaft 204. Each motor 40 can rotate the corresponding one of the first shaft 201, the second shaft 202, the third shaft 203, and the fourth shaft 204.

An axis of each of the first shaft 201, the second shaft 202, and the third shaft 203 is parallel to the Y direction of the coordinate system as shown in FIGS. 1-4. An axis of the fourth shaft 204 is perpendicular to axis of each of the first shaft 201, the second shaft 202, and the third shaft 203, and is parallel to the Z direction of the coordinate system as shown in FIGS. 1-4.

Figure 3:
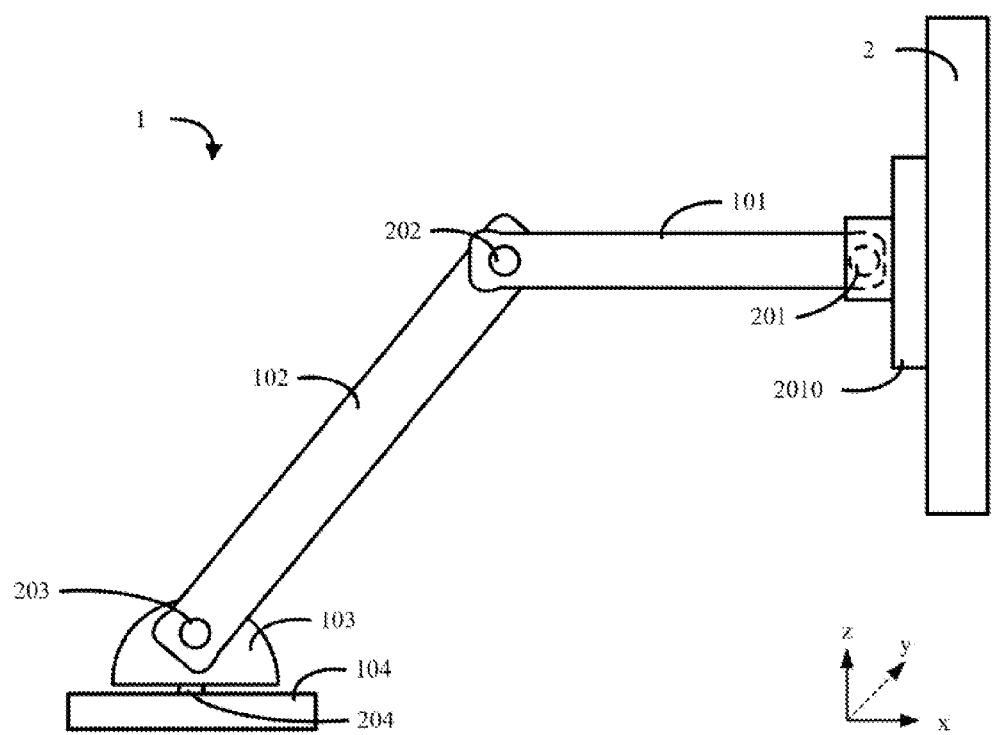
FIG. 3 is a diagrammatic view showing the robotic arm of FIG. 1 in a second state.
Figure 4:
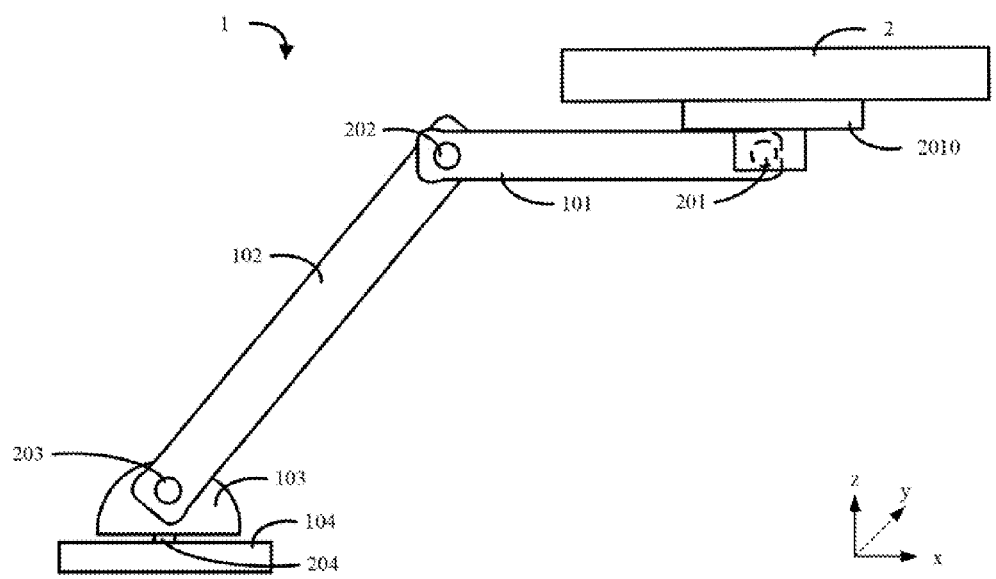
FIG. 4 is a diagrammatic view showing the robotic arm of FIG. 1 in a third state.

Therefore, when the motor 40 secured to the first shaft 201 rotates the first shaft 201 relative to the first connecting member 101, the orientation of the display device 2 within the X-Z plane of the coordinate system can be adjusted (shown in FIGS. 3-4). For example, when the first shaft 201 as shown in FIG. 3 rotates about 90°, the orientation of the display device 2 is adjusted from portrait to landscape (shown in FIG. 4). When the motor 40 secured to the fourth shaft 204 rotates the fourth shaft 204 relative to the fourth connecting member 104, the orientation of the display device 2 within the X-Y plane of the coordinate system can be adjusted.

When the motor 40 secured to the second shaft 202 rotates the second shaft 202 relative to the second connecting member 102, an angle between the first connecting member 101 and the second connecting member 102 is varied, causing the robotic arm 1 to elongate or telescope, thus a distance between the user and the display device 2 can be adjusted. Furthermore, since the first connecting member 101 is rotated relative to the second connecting member 102, the orientation of the display device 2 within the X-Z plane of the coordinate system can be adjusted.

When the motor 40 secured to the third shaft 203 rotates the third shaft 203 relative to the third connecting member 103, an angle between the second connecting member 102 and the third connecting member 103 is varied, causing the robotic arm 1 to elongate or telescope, thus a distance between the user and the display device 2 can be adjusted. Furthermore, since the second connecting member 102 is rotated relative to the third connecting member 103, the orientation of the display device 2 within the X-Z plane of the coordinate system can be adjusted.

When both the second shaft 202 and the third shaft 203 rotate, a distance between the user and the display device 2 may be varied. It depends on a sum of an elongated value or telescoped value caused by the rotation of the second shaft 202 and an elongated value or shortened value caused by the rotation of the third shaft 203. In addition, the orientation of the display device 2 within the X-Z plane of the coordinate system may be adjusted, it depends on a sum of an orientation of the display device 2 caused by the rotation of the second shaft 202 and an orientation of the display device 2 caused by the rotation of the third shaft 203. For example, when the second shaft 202 and the third shaft 203 as shown in FIG. 1 rotate about 135° and 45°, respectively, the robotic arm 1 is elongated, causing the distance between the user and the display device 2 to be decreased, but the orientation of the display device 2 within the X-Z plane of the coordinate system is maintained (shown in FIG. 3).

It is notable that each of the first connecting member 101, the second connecting member 102, the third connecting member 103, and the fourth connecting member 104 has a preset length. As such, the elongated value or telescoped value of the robotic arm 1 can be controlled by rotating the second shaft 202 and/or the third shaft 203 about a corresponding angle.

Figure 5:
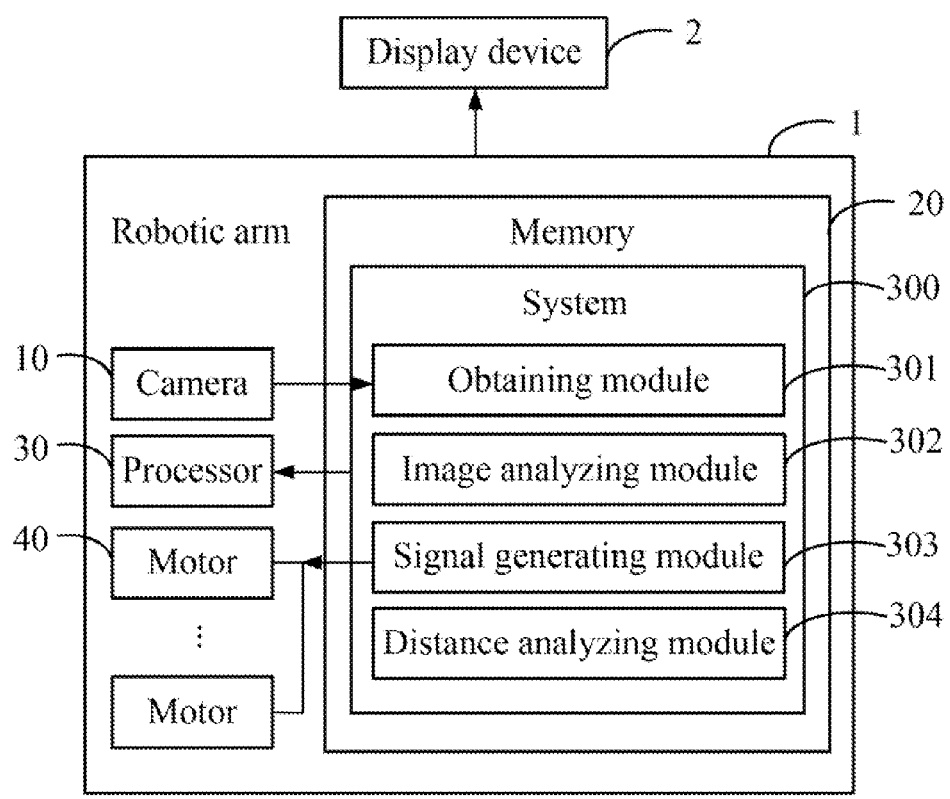
FIG. 5 is a block diagram of the robotic arm of FIG. 1.

FIG. 5 illustrates that the robotic arm 1 further includes a camera 10, a memory 20, and a processor 30. The camera 10 captures images of the user within a preset range in front of the camera 10 (the user is possibly using the display device 2). The camera 10 can be a stereo camera or a Time of Flight (TOF) camera. The memory 20 stores a system 300 for driving the robotic arm 1. The system 300 includes a variety of modules executable by the processor 30 to adjust the orientation of the display device 2 and/or the distance between the user and the display device 2. In the embodiment, the system 300 includes an obtaining module 301, an image analyzing module 302, and a signal generating module 303.

The obtaining module 301 obtains the captured images from the camera 10.

The image analyzing module 302 determines whether a user is moving a body part according to a number of successively obtained images. The image analyzing module 302 further determines a direction and amplitude of the movement of the body part. The body part can be a palm, face, or head of the user. The movement of the body part can be the user waving a palm (that is, a gesture), turning a face, or turning a head.

The signal generating module 303 generates a first control module according to the determined direction and amplitude of the movement of the body part, and transmits the generated first control signal to inform at least one motor 40 to rotate the first shaft 201, the second shaft 202, the third shaft 103, and/or the fourth shaft 104, causing the display device 2 to rotate to a desired angle corresponding to the determined amplitude along the determined direction. As such, the user only needs to wave a palm, move a face, or a head in front of the camera 10, causing the robotic arm 1 to adjust the orientation of the display device 2.

The memory 20 stores a first relationship between different directions of the movement of the body part, the shafts (that is, the first shaft 201, the second shaft 202, the third shaft 203, and the fourth shaft 204) to be rotated, and rotation directions. One direction of the movement of the body part corresponds to one shaft to be rotated, and one rotation direction. The memory 20 further stores a second relationship between different amplitudes of the movements of the body part and rotation angles. One amplitude of the movement of the body part corresponds to one rotation angle. For example, if the direction of the movement of the body part is along the left direction relative to the user, it can be determined according to the first relationship that the corresponding shaft to be rotated is the fourth shaft 204, and the corresponding rotation direction of the fourth shaft 204 is the left direction. If the direction of the movement of the body part is along the upward direction relative to the user, it can be determined according to the first relationship that the corresponding shaft to be rotated is the first shaft 201, and the corresponding rotation direction of the first shaft 201 is the upward direction. The signal generating module 303 determines the shaft to be rotated and the rotation direction corresponding to the direction of the movement of the body part according to the first relationship, determines the rotation angle corresponding to the amplitude of the movement of the body part according to the second relationship, generates the first control module according to the determined shaft to be rotated, the determined rotation direction, and the determined rotation angle, to inform the corresponding motor 40 to rotate the determined shaft secured thereto about the determined rotation angle along the determined direction, causing the display device 2 to rotate about a corresponding angle along the direction of the movement of the body part.

In at least one embodiment, the image analyzing module 302 further calculates the area in which the body part is located in the currently obtained image when the robotic arm 1 receives a trigger signal, and determines whether the calculated area is less than a preset area. If so, the user may not be currently using the display device 2 (for example, the user is leaving the display device 2, or facing away from the display device 2). Then, the signal generating module 303 generates a second control signal and transmits the second control signal to inform at least one corresponding motor 40 to rotate at least one of the second shaft 202 and the third shaft 203, thereby allowing the robotic arm 1 to be shortened to increase the distance between the user and the display device 2. When the calculated area is less than the preset area, the image analyzing module 302 further determines whether the area in which the body part is located keeps increasing in the currently obtained images. If so, the user may be using the display device 2 again. Then, the signal generating module 303 generates a third control signal and transmits the third control signal to inform at least one corresponding motor 40 to rotate at least one of the second shaft 202 and the third shaft 203, thereby allowing the robotic arm 1 to elongate and decrease the distance between the user and the display device 2. In at least one embodiment, the robotic arm 1 further includes a button (not shown). The button can generate the trigger signal when pressed by the user.

In at least one embodiment, the system 100 further includes a distance analyzing module 304. The distance analyzing module 304 determines the distance between the user and the camera 10 (approximately being equaled to the distance between the user and the display device 2) according to the obtained images, and determines whether the determined distance is not equal to a preset distance. If so, the distance analyzing module 304 calculates a difference between the determined distance and the preset distance. The signal generating module 303 generates a fourth control signal according to the calculated difference, and transmits the fourth control signal to inform at least one corresponding motor 40 to rotate at least one of the second shaft 202 and the third shaft 203, thereby allowing the robotic arm 1 to elongate or telescope the calculated difference. As such, the distance between the user and the display device 2 can be maintained at the preset distance. The preset distance can be preset by the user and stored in the memory 20.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A robotic arm connected to a display device, the robotic arm comprising:
    a plurality of connecting members rotatably connected to each other via a plurality of shafts, each of the plurality of shafts able to be rotated by a motor;
    a camera configured to capture images of a user within a preset range in front of the camera; and
    a processor configured to execute a plurality of modules comprising:
        an obtaining module configured to obtain the captured images from the camera;
        an image analyzing module configured to determine whether a user is moving a body part according to a plurality of successively obtained images and determine a direction and amplitude of a movement of the body part; and
        a signal generating module configured to generate a first control module according to the determined direction and amplitude of the movement and transmit the generated first control signal to inform at least one motor to rotate the shaft secured thereto, whereby the display device is configured to rotate about a desired angle corresponding to the determined direction.

2. The robotic arm of claim 1, wherein the signal generating module is configured to determine a shaft to be rotated and a rotation direction corresponding to the direction of the movement of the body part, determine a rotation angle corresponding to the amplitude of the movement of the body part, and generates the first control module according to the determined shaft to be rotated, the determined rotation direction, and the determined rotation angle, to inform the corresponding motor to rotate the determined shaft about the determined rotation angle along the determined rotation direction, causing the display device to rotate about a corresponding angle along the direction of the movement of the body part.

3. The robotic arm of claim 2, further comprising a memory, wherein the memory stores a first relationship between different directions of the movement of the body part, the shafts to be rotated, and rotation directions; one direction of the movement of the body part corresponds to one shaft to be rotated, and one rotation direction; the memory further stores a second relationship between different amplitudes of the movements of the body part and rotation angles; one amplitude of the movement of the body part corresponds to one rotation angle; the signal generating module is configured to determine the corresponding shaft to be rotated and the corresponding rotation direction according to the first relationship, and to determine the corresponding rotation angle according to the second relationship.

4. The robotic arm of claim 1, wherein the image analyzing module is further configured to calculates an area in which the body part is located in a currently obtained image when the robotic arm receives a trigger signal, determine whether the calculated area is less than a preset area, generate a second control signal when the calculated area is less than the preset area, and transmit the second control signal to inform at least one corresponding motor to rotate the shaft secured thereto, thereby allowing the robotic arm to be shortened to increase the distance between the user and the display device.

5. The robotic arm of claim 4, wherein the image analyzing module is further configured to determine whether the area in which the body part is located keeps increasing in the currently obtained images if the calculated area is less than the preset area, generate a third control signal if the area of the body part keeps increasing, and transmit the third control signal to inform at least one corresponding motor to rotate the shaft secured thereto, thereby allowing the robotic arm to elongate and decrease the distance between the user and the display device.

6. The robotic arm of claim 5, wherein the plurality of modules further comprises a distance analyzing module configured to determine a distance between the user and the camera according to the obtained images, determine whether the determined distance equals to a preset distance or not, calculate a difference between the determined distance and the preset distance if the determined distance does not equal to the preset distance, generates a fourth control signal according to the calculated difference, and transmit the fourth control signal to inform at least one corresponding motor to rotate the shaft secured thereto, thereby allowing the robotic arm to elongate or telescope the calculated difference and the distance between the user and the display device to be maintained at the preset distance.

7. The robotic arm of claim 6, wherein the plurality of connecting members comprises a first connecting member, a second connecting member, a third connecting member, and a fourth connecting member; the plurality of shafts comprises a first shaft, a second shaft, a third shaft, and a fourth shaft; an end of the first connecting member is rotatably connected to the display device via a first shaft; an opposite end of the first connecting member away from the first shaft is rotatably connected to an end of the second connecting member via a second shaft; an opposite end of the second connecting member away from the second shaft is rotatably connected to the third connecting member via a third shaft; a bottom of the third connecting member is rotatably connected to the fourth connecting member via a fourth shaft.

8. The robotic arm of claim 7, wherein a securing mechanism is secured to the first shaft; a back portion of the display device is secured to the first shaft via the securing mechanism, thereby securing to the robotic arm.

9. The robotic arm of claim 7, wherein an axis of each of the first shaft, the second shaft, and the third shaft is parallel to Y direction of a coordinate system; an axis of the fourth shaft is perpendicular to the axis of each of the first shaft, the second shaft, and the third shaft, and is parallel to Z direction of the coordinate system; the motor secured to the first shaft rotates the first shaft, causing an orientation of the display device within a X-Z plane of the coordinate system to be adjusted; the motor secured to the fourth shaft rotates the fourth shaft, causing an orientation of the display device within a X-Y plane of the coordinate system to be adjusted; the motor secured to the second shaft or the third shaft rotates the second shaft or the third shaft, causing a distance between the user and the display device to be adjusted and an orientation of the display device within the X-Z plane of the coordinate system to be adjusted.

10. The robotic arm of claim 9, wherein the first control signal is configured to control the corresponding motor to rotate the first shaft, the second shaft, the third shaft, the fourth shaft, or a combination thereof; each of the second control signal, the third control signal, and the fourth control signal is configured to control the corresponding motor to rotate the second shaft or the third shaft or both.

11. The robotic arm of claim 1, wherein the camera is a stereo camera or a TOF camera.

12. A display device comprising:
a robotic arm comprising:
an obtaining module configured to obtain captured images from a camera;
an image analyzing module configured to determine whether a user is moving a body part according to a plurality of successively obtained images and determine a direction and amplitude of a movement of the body part; and
a signal generating module configured to generate a first control module according to the determined direction and amplitude of the movement and transmit the generated first control signal to inform at least one motor to rotate the shaft secured thereto, whereby the display device is configured to rotate about a desired angle corresponding to the determined amplitude along the determined direction;
wherein the image analyzing module is further configured to calculates an area in which the body part is located in a currently obtained image when the robotic arm receives a trigger signal, determine whether the calculated area is less than a preset area, generate a second control signal when the calculated area is less than the preset area, and transmit the second control signal to inform at least one corresponding motor to rotate the shaft secured thereto, thereby allowing the robotic arm to be shortened to increase the distance between the user and the display device.

13. The display device of claim 12, wherein the signal generating module is configured to determine a shaft to be rotated and a rotation direction corresponding to the direction of the movement of the body part, determine a rotation angle corresponding to the amplitude of the movement of the body part, and generates the first control module according to the determined shaft to be rotated, the determined rotation direction, and the determined rotation angle, to inform the corresponding motor to rotate the determined shaft about the determined rotation angle along the determined rotation direction, causing the display device to rotate about a corresponding angle along the direction of the movement of the body part.

14. The display device of claim 13, further comprising a memory, wherein the memory stores a first relationship between different directions of the movement of the body part, the shafts to be rotated, and rotation directions; one direction of the movement of the body part corresponds to one shaft to be rotated, and one rotation direction; the memory further stores a second relationship between different amplitudes of the movements of the body part and rotation angles; one amplitude of the movement of the body part corresponds to one rotation angle; the signal generating module is configured to determine the corresponding shaft to be rotated and the corresponding rotation direction according to the first relationship, and to determine the corresponding rotation angle according to the second relationship.

15. The display device of claim 12, wherein the image analyzing module is further configured to determine whether the area in which the body part is located keeps increasing in the currently obtained images if the calculated area is less than the preset area, generate a third control signal if the area of the body part keeps increasing, and transmit the third control signal to inform at least one corresponding motor to rotate the shaft secured thereto, thereby allowing the robotic arm to elongate and decrease the distance between the user and the display device.

16. The display device of claim 15, wherein the plurality of modules further comprises a distance analyzing module configured to determine a distance between the user and the camera according to the obtained images, determine whether the determined distance equals to a preset distance or not, calculate a difference between the determined distance and the preset distance if the determined distance does not equal to the preset distance, generates a fourth control signal according to the calculated difference, and transmit the fourth control signal to inform at least one corresponding motor to rotate the shaft secured thereto, thereby allowing the robotic arm to elongate or telescope the calculated difference and the distance between the user and the display device to be maintained at the preset distance.

* * * * *